United States Patent [19]

Pettersson

[11] 4,170,806
[45] Oct. 16, 1979

[54] METHOD OF FIXING A FISH AS TO THE POSITION THEREOF IN A FISH PROCESSING MACHINE AND A MACHINE FOR PERFORMING SAID METHOD

[75] Inventor: Viktor E. Pettersson, Kullavik, Sweden

[73] Assignee: Arenco Aktiebolag, Vastra Frolunda, Sweden

[21] Appl. No.: 820,040

[22] Filed: Jul. 29, 1977

[30] Foreign Application Priority Data

Aug. 5, 1976 [SE] Sweden .............................. 7608788

[51] Int. Cl.² ............................................. A22C 25/14
[52] U.S. Cl. ...................................................... 17/63
[58] Field of Search ................... 17/52, 59, 60, 61, 63; 198/692, 693

[56] References Cited

U.S. PATENT DOCUMENTS

| Re. 29,432 | 10/1977 | Leander et al. ............................ 17/63 |
| 1,574,949 | 3/1926 | Vogt ..................................... 196/692 |
| 2,920,343 | 1/1960 | Bartels et al. ........................ 17/63 X |
| 2,955,316 | 10/1960 | Danielsson ............................... 17/61 |
| 2,961,697 | 11/1960 | Schlichting ........................... 17/63 X |
| 3,925,846 | 12/1975 | Leander ..................................... 17/60 |

FOREIGN PATENT DOCUMENTS 2554598  6/1976  Fed. Rep. of Germany .............. 17/63

Primary Examiner—Travis S. McGehee
Attorney, Agent, or Firm—Hubbell, Cohen, Stiefel & Gross

[57] ABSTRACT

An apparatus and a method for separating fish heads from the remainder of the fish are provided. The apparatus includes a cutting blade, a conveyor movable in a predetermined path past the cutting blade and tapered pins extending through and each having a free end protruding from the conveyor. The pins gradually narrow along the direction towards their free ends. The free end of each pin passes through the eyes of a fish to thereby fix the position of the fish relative to the cutting blade. The feature of tapering determines how far along the length of the pin the fish will be impaled; a smaller fish with relatively smaller eyes will be carried on the pin at a relatively higher level above the conveyor than a larger fish. Such a variation of the positioning of the fish relative to the size of the fish promotes considerable conservation of the food quality portions of the fish body as wastage is more exactly limited to the discarding of the head. A method for separating the fish head from the remainder of the fish is also provided.

13 Claims, 5 Drawing Figures

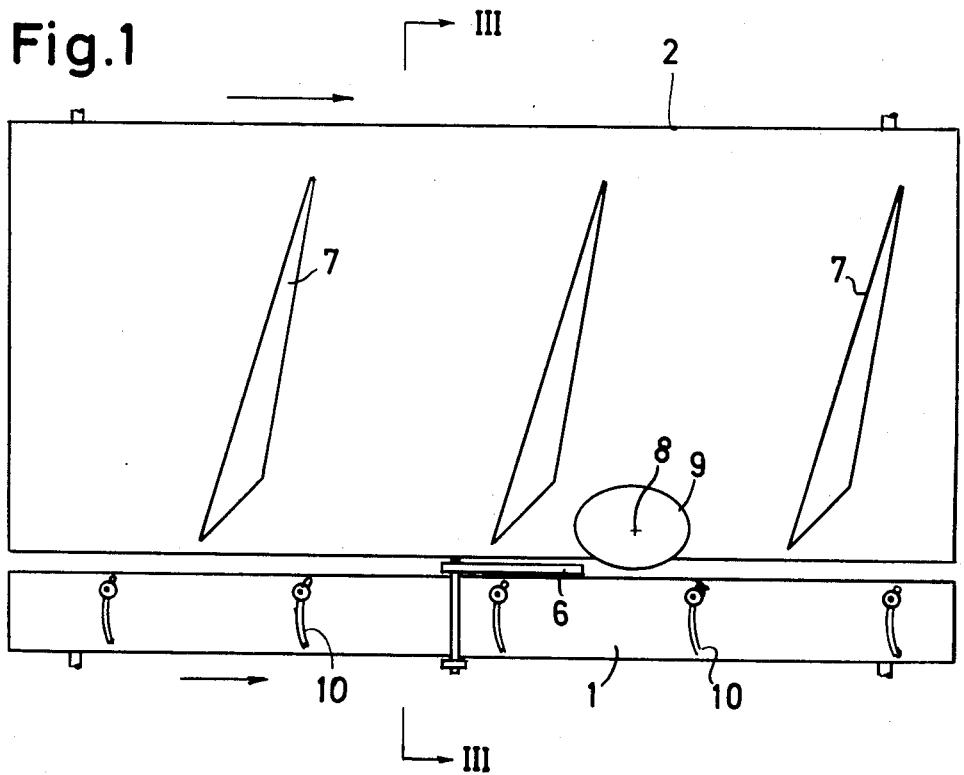
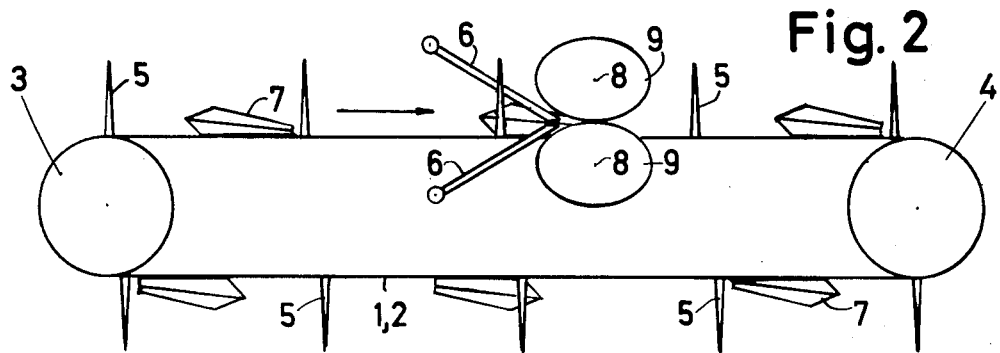

METHOD OF FIXING A FISH AS TO THE POSITION THEREOF IN A FISH PROCESSING MACHINE AND A MACHINE FOR PERFORMING SAID METHOD

BACKGROUND OF THE INVENTION

The present invention relates to a method of fixing the position of a fish in a fish processing machine and a machine for performing said method, said machine comprising at least one member for processing the fish, members for conveying the fish towards and past the processing members and members for fixing the position of the fish relative to the processing members during the processing.

When processing a fish in fish processing machines, it is essential to be able to determine the position of the fish relative to the processing members, so that said members actually process the intended portions of the fish. This is especially important when the processing members comprise one or several knives, which cut away an indefinite portion of the fish, because the high kilo price of the fish implies that as little as possible of usable fish meat should be cut away.

SUMMARY OF THE INVENTION

In view of this, the main object of the invention is to bring forth a method and a machine, which provide maximally exact fixing of the fish's position during the processing thereof in the machine.

This object is achieved by the method and the machine are as defined in claims 1 and 10, respectively.

Further features and advantages of the method and the machine according to the invention appear from the following detailed specification and the accompanying drawings that schematically and without limitation disclose a couple of embodiments of the invention applied in a fish head cutting machine.

BRIEF DESCRIPTION OF THE DRAWINGS

FIG. 1 is a plan view seen perpendicularly relative to the main plane of the machine and discloses a fish head cutting machine according to a first embodiment of the invention.

FIG. 2 is a view corresponding to FIG. 1, but seen from below in FIG. 1.

DETAILED DESCRIPTION OF THE PREFERRED EMBODIMENT

Figure 3:
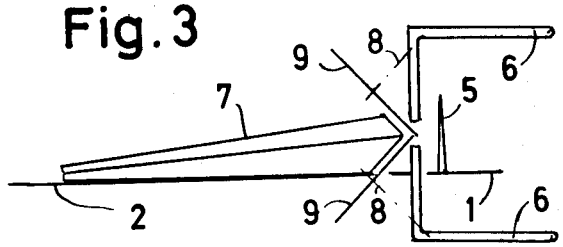
FIG. 3 is a cross-section substantially along the line III—III in FIG. 1.

In the embodiment disclosed in FIGS. 1-3 the fish head cutting machine according to the invention comprises two endless belts 1,2 or chains or pair of chains equivalent thereto, said belts running in the direction of the arrows, each belt around a pair of rollers or sprockets, of which only the sprocket 3, 4 of the belt 1 are shown in FIG. 2. In practice, the runs of the belts 1, 2 may be inclined a small angle upwardly relative to the horizontal plane in the feeding direction indicated by the arrows from the input end (the left end in FIGS. 1 and 2) to the output end.

A number of nails or pins 5 are attached to the belt 1 and preferably they are equally spaced, and they taper in a conical or other suitable way towards their free end, which protrudes from the belt 1 as illustrated most clearly in FIG. 2. Besides, the pins 5 are movable in suitably curved tracks or channels 10 in the belt 1 in a direction substantially perpendicular to the conveying direction and in dependence on the thickness of the relatively rigid portions of the fish head lying between the gill arc and the eyes. This thickness is measured by means of a pair of measuring arms 6, which are synchronizably rotatable towards and away from each other. The measuring position of the arms 6 are transferred to the pins 5. By means of unillustrated curve discs or a similar means the pins are displaced progressively further away from the belt 2 the larger the thickness (and consequently also the length) of the fish. This displacement of the pins 5 in dependence of the length of the fish head preferably may be obtained by means of a device according to the U.S. Pat. No. 3,925,847, to which reference is made herein.

At the belt 2, preferably equally spaced, there are attached fish supports or pushers 7. The pushers 7 consist of angularly bent plates, the profile of two which corresponds to a V lying on its side, whereby the juncture of the plates forms an inclined edge which forms the tip of the V. The edge preferably forms an acute angle relative to the movement direction of the belt 2 as shown in FIG. 1, the plates are turned so that their portions with the greatest width perpendicular to belt 2 face the movement direction and are located at a somewhat higher level than the upper run of the belt 2. The plate halves forming the legs of the V are shaped as triangles having one obtuse angle and two acute angles, which means that the size of the legs of the V increases from zero at the end of the pushers located closest to the belt to a maximum lying relatively close to the belt and thereafter again decreases towards zero.

As shown in FIGS. 1 and 2, the pitch of the pushers 7 is larger than that of the pins 5. Therefore, the speed of the belt 2 is proportionately higher than the speed of belt 1 so that both belts are moved proportionately (between the pins 5 and pushers 7, respectively) during the same time period (for example, approximately 0.5 seconds).

Between the belts 1 and 2 the fish head cutting members are arranged. The preferred and disclosed embodiment comprises a pair of co-operating circular knives 9 rotating around shafts 8, the planes of said knives forming an angle of the magnitude of 90° relative to each other. Said planes substantially coincide with the planes, in which the halves of the pushers are located, as the pushers pass the knives 9. The two edges of the pushers 7 located closest to the knives 9, are substantially parallel to a respective one of said planes. Preferably, the knives 9 have such a direction of rotation that the edge portions thereof just cutting through the fish and located close to each other (abutting) move in a peripheral direction substantially coinciding with the conveying direction of the fish.

The machine according to FIGS. 1-3 is used and operates in the following way:

During the movement of the belts 1 and 2 in the direction of the arrows, the fishes are pressed manually on to the pins or nails 5, whereby the eyes of the fish are used as an aiming target for the pin 5, which is to be pressed into one of the eyes and out through the other eye of the fish. Due to the gradual narrowing of the pin, a smaller fish, which has smaller eyes than a larger fish, is stopped higher up on the pin 5. This implies that the longitudinal center plane of the fish will be located approximately aligned with the tip of the shapes, which are formed by the pushers 7 and the knives 9, respectively, independently of the size of the fish.

Before the fish arrives to the pair of knives 9, the thickness of the head of the fish is measured by means of the measuring arms 6 and the value of the thickness is transformed to a displacement of the pin 5 (and consequently also the fish) in the track 10 so that the cut will be made where it is an optimum from the point of view of wastage, independently of the size of the fish.

Due to the V-shaped mutual inclination of the knives 9, the cut will of course also be V-shaped, seen in cross-section perpendicularly to the cutting line. Due to the fact that a pusher 7 overtakes a co-operating pin 5 and the fish threaded thereon just before the cutting and passes the pin during the cutting operation, the mid and back portions of the fish are turned forwardly in the feeding direction by the pusher with the pin 5 as a rotation shaft (clockwise direction in FIG. 1), which implies that the cut is made along a curve arc, which gives a convex shape of the side of the fish head facing the knives 9. Hereby, the wastage is reduced further.

Figure 4:
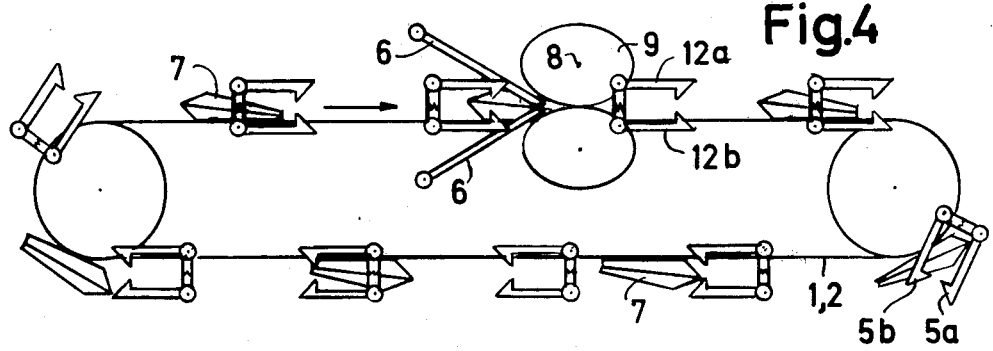
FIG. 4 is a side-view corresponding to FIG. 2 and disclosing a modified embodiment of the fish processing machine according to the invention.
Figure 5:
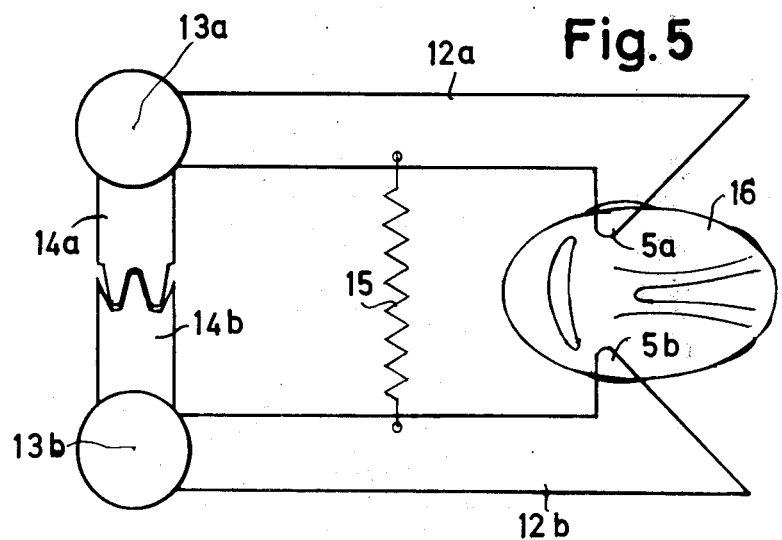
FIG. 5 is a partial view at a larger scale disclosing the pins and the members belonging thereto, whereby also a fish has been shown.

The modified embodiment according to FIGS. 4-5, wherein the same reference numbers as in FIGS. 1-3 have been used, with the addition of letters for denoting the same or analogous elements, differs from the embodiment described above in that each pin 5 is replaced by a pair of pins 5a, 5b. The pins 5a, 5b form parts of arms or legs 12a, 12b of pliers, which synchronously are rotatable towards and away from each other around shafts 13a and 13b, respectively, in that they are rigidly connected to each other by gear segments 14a, 14b. Besides, the arms are biased in a direction towards each other by a tension spring 15. The external sides of the pins 5a, 5b facing away from the shafts 13a, 13b are extended outwardly away from the shafts 13a, 13b in order to act as guiding members for guiding in a fish between the pins. When a fish is attached to said pins, the fish head is pressed manually between the pins 5a, 5b and overcomes the spring force, whereafter the pins are pressed into the eyes of the fish by the spring 15 or in another manner (possibly manually).

Relative to the embodiment according to FIGS. 1-3 the just described modification has the advantage that the fish is more thoroughly fixed on the pins 5a, 5b than on the pin 5, on which pin the fish may tilt somewhat due to the draft of the pins. Further on, it is somewhat easier to exactly hit the two eyes of the fish by means of the pins 5a. 5b.

The embodiments that have been described and shown in the drawings of course are to be regarded as non-limiting examples and as to details they can be modified in several ways within the frame of the accompanying claims. Thus, for instance, new embodiments, which fall within the scope of the invention, may be created by a combination of details obtained from different embodiments of the described embodiments. Neither is the invention limited to head cutting as it with advantage may be applied also in connection with other fish processing operations, e.g. belly ripping and entrail removing. Further on, the nails or pins 5 may be given e.g. a triangular cross section instead of a circular one.

I claim:

1. An apparatus for separating a fish head from the remainder of a fish, the apparatus comprising in combination, a cutting blade; a first conveyor movable in a predetermined path past the cutting blade; and means for fixing a position of a fish above the conveyor and relative to the cutting blade, said means comprising a tapered pin operatively connected to and extending upwardly from the first conveyor and having a free end protruding therefrom for insertion into the eye socket of a fish, the tapered pin gradually narrowing in the direction towards the free end, whereby the free end is inserted through the eye socket of the fish and the fish slides onto the tapered pin until the sockets fit closely with the tapered pin, whereby the fish is firmly positioned on the tapered pin irrespective of the size of the fish; and a second tapered pin, and wherein said first and second tapered pins are operatively connected to said first conveyor by means including pliers having two arms, each having a free end, each of which is connected to a respective one of the pins, two shafts each of which is connected to a respective one of the other ends of the arms, each arm being rotatable about its respective shaft, means connected to the shafts for rigidly connecting the arms by extending between portions of the arms intermediate the respective free ends and the other ends.

2. The apparatus of claim 1, the tapered pins being upright.

3. The apparatus of claim 1, the tapered pins being at least substantially perpendicular to the predetermined path.

4. The apparatus of claim 1, the tapered pin having a conical shape.

5. The apparatus of claim 1, the tapered pins having a circular cross section.

6. The apparatus of claim 1, the conveyor being upwardly inclined in the direction of the predetermined path relative to a horizontal plane.

7. The apparatus of claim 1, the cutting blade comprising a pair of rotating circular knives.

8. The apparatus of claim 7, said knives being disposed at an angle of about 90° relative to each other.

9. The apparatus of claim 1, further comprising a second conveyor and at least one fish support on the second conveyor, the fish support and the tapered pin being on opposite sides of the cutting blade.

10. The apparatus of claim 1, said one fish support having a V-shaped form and being attached to the second conveyor along one leg of the V-shaped form.

11. The apparatus of claim 10, the fish support having a greater pitch than the tapered pin and the second conveyor moving at a proportionately greater speed.

12. The apparatus of claim 11, the fish support extending to about the same height above the second conveyor as the pin has above the first conveyor.

13. An apparatus for separating a fish head from the remainder of a fish, the apparatus comprising in combination, a cutting blade; a first conveyor movable in a predetermined path past the cutting blade; and means for fixing a position of a fish above the conveyor and relative to the cutting blade, said means comprising a tapered pin operatively connected to and extending upwardly from the first conveyor and having a free end protruding therefrom for insertion into the eye socket of a fish, the tapered pin gradually narrowing in the direction towards the free end, whereby the free end is inserted through the eye socket of the fish and the fish slides onto the tapered pin until the sockets fit closely with the tapered pin, whereby the fish is firmly positioned on the tapered pin irrespective of the size of the fish; and means for displacing a fish in a direction substantially perpendicular to the predetermined path, said first conveyor having a channel extending generally perpendicularly to the predetermined path, the tapered pin being movable therein, said means comprising measuring means for displacing the tapered pin within the channel in dependence on the thickness of the head of the fish.

* * * * *